US012657455B2

(12) United States Patent
Baptista De Souza et al.

(10) Patent No.: US 12,657,455 B2
(45) Date of Patent: Jun. 16, 2026

(54) COMPUTER IMPLEMENTED PRE-PROCESSING METHOD AND SYSTEM FOR FACILITATING MACHINE LEARNING SIGNAL CLASSES SEPARABILITY, AND, NON-TRANSITORY COMPUTER READABLE STORAGE MEDIUM

(71) Applicant: SAMSUNG ELETRÔNICA DA AMAZÔNIA LTDA., Campinas (BR)

(72) Inventors: Douglas David Baptista De Souza, Campinas (BR); Fernanda De Souza Ferreira, Campinas (BR)

(73) Assignee: SAMSUNG ELETRÔNICA DA AMAZÔNIA LTDA., Manaus (BR)

( * ) Notice: Subject to any disclaimer, the term of this patent is extended or adjusted under 35 U.S.C. 154(b) by 1163 days.

(21) Appl. No.: 17/669,893

(22) Filed: Feb. 11, 2022

(65) Prior Publication Data

US 2023/0214643 A1 Jul. 6, 2023

(30) Foreign Application Priority Data

Dec. 30, 2021 (BR) ...................... 10 2021 026836-0

(51) Int. Cl.
G06N 3/08 (2023.01)
G06F 17/16 (2006.01)

(52) U.S. Cl.
CPC .............. G06N 3/08 (2013.01); G06F 17/16 (2013.01)

(58) Field of Classification Search
CPC .................................. G06N 3/08; G06F 17/16
See application file for complete search history.

(56) References Cited

U.S. PATENT DOCUMENTS 11,694,251 B2 * 7/2023 Sim ........................ H04W 4/029
705/26.7
12,119,022 B2 * 10/2024 Sinha ..................... G06N 20/00
(Continued)

FOREIGN PATENT DOCUMENTS

CN 110751955 A 2/2020
KR 10-2020-0044189 A 4/2020

OTHER PUBLICATIONS

Ulysse Côté-Allard, et al., "Deep Learning for Electromyographic Hand Gesture Signal Classification Using Transfer Learning", IEEE Engineering in Medicine and Biology Society, Jun. 2018.
(Continued)

*Primary Examiner* — Elias Desta
(74) *Attorney, Agent, or Firm* — STAAS & HALSEY LLP

(57) ABSTRACT

A computer implemented pre-processing method for facilitating machine learning signal classes separability by evaluating candidate time-frequency transformations to be applied to a set of input signals to generate less redundant features. The computer implemented pre-processing method includes obtaining M candidates of time-frequency transformation rules for the set of input signals, for the M candidates, employing the obtained transformations to calculate time-frequency matrices for at least one signal of each class within the set of input signals and assessing class separability in feature space through the minimization of a multi-parameter objective function that considers the value of the overlapping between the areas of intra-class and the inter-class distributions of distances between the time-frequency matrices. A system and a non-transitory computer readable storage medium for performing the method for evaluating candidate time-frequency transformations and data-augmentation method effects.

26 Claims, 4 Drawing Sheets
(2 of 4 Drawing Sheet(s) Filed in Color)

(56) References Cited

U.S. PATENT DOCUMENTS

| | | | | |
|---|---|---|---|---|
| 12,242,567 B2 * | 3/2025 | Kleijn | ................. | G06F 18/2113 |
| 2022/0253699 A1 * | 8/2022 | Hoshen | .................... | G06N 3/09 |

OTHER PUBLICATIONS

Elly C. Knight, et al., "Pre-Processing Spectrogram Parameters Improve the Accuracy of Bioacoustic Classification Using Convolutional Neural Networks", Department of Biological Sciences, University of Alberta, Edmonton, Canada, Apr. 2019.
Jakob Abeßer, "A Review of Deep Learning Based Methods for Acoustic Scene Classification", MDPI Applied Sciences, Mar. 16, 2020.

* cited by examiner

COMPUTER IMPLEMENTED PRE-PROCESSING METHOD AND SYSTEM FOR FACILITATING MACHINE LEARNING SIGNAL CLASSES SEPARABILITY, AND, NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2021 026836-0, filed on Dec. 30, 2021, in the Brazilian Intellectual Property Office, the disclosure of which is incorporated by reference herein in its entirety.

FIELD OF THE DISCLOSURE

The technical field of this invention is machine learning applied to the classification of speech signals, or waveforms. More specifically, the present invention relates to a method for evaluating candidate time-frequency transformations or data-augmentation effects to be applied to a set of input speech signals, wherein the candidate time-frequency transformations are to be used in a machine learning model built for working speech applications.

In its core, the proposed invention is a preprocessing methodology to be applied to speech datasets, not to models, aiming to find discriminative time-frequency transformations to be used by the audio or speech signal processing/ machine learning pipeline.

BACKGROUND OF THE INVENTION

Electrical signals are important information carriers in many real-world applications of engineering and science. These electrical signals are generally acquired by transducers, which transform a mechanical or electromagnetic waveform into electrical current, which can be sampled, quantized and stored as long arrays of numbers that vary over time. When processed by computers or algorithms, these long arrays of numbers are commonly referred to as simply as signals. Among the different types of electrical signals, speech signals are of particular interest and importance in many modern applications, like automatic voice recognition, alarm systems, and cybersecurity pipelines.

Traditionally, statistical analysis of signals has been carried out to study and extract relevant pieces of information for specific application involving speech processing and recognition. Examples are the statistical analyses of voice signals to detect emotions, spoken commands, changes in spoken intonation, accents and fatigue.

A common task among the areas cited above is the use of statistical methods to classify samples of speech signals into different categories. For example, segments of speech signals can be classified into different keyword categories, which can be used as a flag to automatically activate an electronic device.

The classical framework to build classifiers for speech signals is centered around a machine learning model, which is trained considering relevant features extracted from the speech signal. Feature extraction methods is a topic widely covered in the literature. These methods can combine domain-specific knowledge (i.e., specific to the application and the nature of the signals) and advance statistics to build powerful features, which serve as input to traditional machine learning models, such as random forest and support vector machines (SVM).

This strategy of intelligent feature extraction combined with traditional machine learning modelling (e.g., SVM) was the most common manner to build speech signal classifiers until very recently. With the explosion of deep learning approaches especially around 2014, neural network architectures such as convolutional neural networks (CNNs) have grown in popularity due to their excellent performance for classifying.

A great deal of research has been done to improve these CNN models and, in the years that followed the rise in popularity of CNNs, many deep learning architectures and frameworks have been made freely available to the public. In recent years, CNN-based models commonly used for feature recognition (a two-dimensional input data) have been employed as classification tools for speech signals.

To accomplish this task, however, the original speech signals usually need to be transformed into 2D-, image-like representations such as a matrix or a gray-scale image, which can be done by using techniques such as Recurrent Plots (RP), statistical/computational pipelines like DeepInsight and Iss2Image, or classical (analytic) mathematical approaches like time-frequency transformations.

Time-frequency transformations have become the the de facto tools to generate image-like features for CNN-based classifiers, especially for speech signals, which exhibit a waveform behavior (i.e., they are composed by oscillating components).

Examples of modern applications of machine learning models for speech classification are keyword detection and virtual-assistant detection systems (e.g., Hi Bixby). The systems built often use convolutional neural networks (CNN) and need to transform the input signal from time domain to time-frequency domain, creating image-like input features to be processed by the CNN architecture (e.g., a spectrogram). Also, for training these machine-learning models for speech tasks, there is often a need of selecting a pool of data augmentation effects to increase the stochasticity in the training data, thus improving the generalization capability of the model.

However, there is no unique way to transform the speech signal from time domain (1D) to time-frequency domain (2D). In fact, there is an infinite number of manners a time-frequency representation (a 2D input feature) such as the spectrogram can be created. In other words, there are infinite time-frequency transformations. Nevertheless, there is no a priori choice on which data augmentation effect (if any) should be applied to the input signals.

It should be noted that domain knowledge can be considered to guide the choices of time-frequency transformations and data augmentation in a machine learning system. However, due to the data-driven nature and inherent "big data" aspect of many machine learning problems, relying purely on domain knowledge to pick the time-frequency transformations and data augmentation may not be feasible. Also, simply probing one or another method for feature generation and checking which one improves model classification and convergence performances may not be practical: training deep learning models can take days, so "closing the loop" to monitor model performance in light of the feature choice may not be possible.

Time-frequency representations, which are the 2D "outputs" of time-frequency transformations, describe how the frequency content of the speech signal varies over time. There are many different time-frequency transformation setups that could be considered to transform the speech signal from time domain to time-frequency domain. This arbitrariness in choosing a time-frequency transformations setup to create the necessary image-like features for CNNs is one of the challenges often faced by machine learning applications intended to process and classify speech signals.

It should be remarked that part of the literature on time-frequency representations from the past 40 years is yet to be discovered by the machine learning community. CNN-based models to classify signals via time-frequency representations are relatively recent: most of the works are from 2014 onwards and the most of them still make use of spectrograms until today. On the other hand, the limitations of the spectrogram as a time-frequency transformation have been discussed since the 80s, and a consolidate literature on alternative time-frequency transformations is available at least since the 90s.

Nevertheless, selecting time-frequency transformations is not just a matter of arbitrary choice: poorly chosen time-frequency transformation setups can mask or attenuate relevant features of the original signals, which can result in time-frequency matrices that are less informative for the classification task. Thus, if these transformations are not chosen appropriately, one can create poor input features for the machine learning model to learn from, which can limit the classification performance. This fact highlights a relevant distinction that arrives when building machine learning models to classify time-frequency matrices, as compared to images. Even though the model input features are essentially 2D arrays in both cases, in image classification tasks, the machine learning model (e.g., a CNN) is often trained directly in the data domain we want to learn from (i.e., the image dataset). In turn, in tasks involving classification of time-frequency matrices, the model is trained in a transformed domain, which is not the domain where the original data samples (i.e., the signals) have been collected/observed.

A byproduct of poorly chosen time-frequency transformations and data augmentation is a poor feature separability. One aspect related to the poor choice of transformations is generating time-frequency matrices that tend to be similar across different classes. For the tasks that aim at classifying speech signals into different classes, such similarity among different classes (or intra-class similarity) is usually reflected as input features (i.e., time-frequency matrices) that are more alike, less separated in time-frequency/feature space.

For example, mel-spectrogram is a form of time-frequency transformation that is well suited to be applied to short speech signals in speech recognition problems, as this time-frequency transformation tends to accentuate more relevant speech-specific features, thus making signal (speech) samples more easily discriminated by the model in time-frequency feature space. However, mel-spectrograms are not well suited to represent longer speech signal segments, and other transformations like mel-frequency cepstral coefficients (MFCCs) can be used.

Ensuring that samples (in this case, signals) of different classes are sufficiently dissimilar or distant from each other in the chosen feature space (in this case, the time-frequency matrices) is a well-known problem in data science and machine learning. The idea being that, if samples of different classes are well separate in the feature space, then it would be easier for the machine learning model to classify the input features as belonging to one or another class. Therefore, the choice itself of the time-frequency transformation to use can impact class separability and the classification performance.

In addition to the choice of the time-frequency transformation, there are other computation steps that can end up affecting the data separability in the feature space. One example being the application of data augmentation. In a machine learning framework, data augmentation is usually employed to simulate the natural variability that would be expected in real-world data. However, the application of data augmentation effects to the input signal acts like an a-priori transformation that necessarily affects the time-frequency matrices (since these matrices will not be computed from the original signal, but from modified/augmented version of it). Also, in some cases, applying a given data augmentation effect to a set of input signals may be equivalent to add correlation in feature space, which in turn can cause the resulting time-frequency matrices to be less separable in the feature space.

DESCRIPTION OF THE RELATED ART

In the state of the art, there are some documents related to using time-frequency matrices in machine learning models for the tasks of processing and analyzing signals of different types, which could also be considered for the case of speech signals.

Specifically, document CN110751955 "Time-frequency matrix dynamic selection-based sound event classification method and system", by Univ Shandong, published on Feb. 4, 2020, proposes a method to classify sounds based on the selection of time-frequency matrices computed from a reference spectrogram calculated from records of environment, acoustic scene sounds. The selected time-frequency matrices are reduced (smaller) versions of the original (bigger) spectrogram. Dynamic time warping technique is used for assessing the similarity between the original spectrogram and the reduced time-frequency matrices. The points in common between the present invention and patent CN110751955 are that both make use of groups of time-frequency representations (time-frequency matrices) and employ dissimilarity measures to calculate the distance between them. The present invention differentiates from this patent because it concerns a different, more general application than the problem of classifying sounds. Also, the comparisons involving time-frequency representations in the present invention are not made between an original (reference) spectrogram and its reduced versions, but between the full time-frequency representations of every signal combinations selected from the dataset of signals chosen to be processed. The time-frequency transformations and the parameters to compute them are also allowed to vary in the present invention. Moreover, the patent CN110751955 does not include the evaluation of different data-augmentation (DAug) effects. Finally, the choices of metrics used to compare time-frequency matrices in the present invention do not contemplate dynamic time warping.

Document KR20200044189 "System and Method for Preprocessing and Data Set Augmentation for training with Data Processing", by Univ Dankook IACF, published on Apr. 29, 2020, proposes a method to generate pre-processed sequential data to be used by machine learning systems that require large datasets organized in a sequential manner to be trained. Examples of such datasets are videos, which consists of multiple sequential images (frames) and are considered as 3D data samples (2 dimensions for the images and another one for their evolution over time). To generate the synthetic data samples, random sub-samples of an input 3D data chunk are drawn and then processed by a 2D motion history image (MI) block, and then by a machine learning processing unit. The points in common between the present invention and patent KR20200044189 (A) are that both employ the idea of using data augmentation to generate synthetic samples. The present invention differentiates from this patent because it is not intended to function as an actual data generator for machine learning systems, but as an analysis to tool to help guide the choice of what time-frequency representations and data-augmentation effects to use when processing a given set of input signals. Also, while patent KR20200044189 is concerned with 3D datasets (e.g., sequential images in videos), the present invention concerns machine learning applications for signals and time series.

The paper "A Review of Deep Learning Based Methods for Acoustic Scene Classification", Appl. Sci. 2020, 10(6), 2020 by Jakob Abeßer, reviews all the main steps usually taken for developing machine learning system to classify audio samples for scene (environment) classification and audio event detection. It lists the state-of-the-art approaches and current trends for data and feature pre-processing, feature representation, data augmentation, model choices and learning paradigms. The points in common between the present invention and this paper are that both acknowledge the importance of choosing adequate time-frequency transformations to represent signals in the desired feature space for some of the state-of-the-art machine learning models (e.g., CCNs). The importance of data augmentation is also discussed. The present invention differentiates from that paper because the core ideas of the proposed method (i.e., use of random selection to choose time-frequency and data-augmentation transformations that could increase class separability in feature space) are not commented. Also, the scope of the paper is for the application area of audio event detection and audio scene classification, while the present concerns machine learning applications for any type of signals and time series.

The paper "Deep Learning for Electromyographic Hand Gesture Signal Classification Using Transfer Learning", IEEE Transactions on Neural Systems and Rehabilitation Engineering, vol. 27, no. 4, April 2019 by Ulysse Côté-Allard et al. proposes a CNN-based machine learning model to classify electromyography (EMG) signals collected from a multitude of subjects aiming to identify different hand gestures. To do so, it makes use of Spectrogram and Wavelet transform to create the necessary time-frequency matrices (images) to feed the CNN-based model. The points in common between the present invention and this paper are that both acknowledge the importance of preprocessing data to boost the classification performance of time-frequency-based CNN models. The present invention differentiates from this paper because the proposed preprocessing in the paper is fixed, and does not take into account the effect of the chosen preprocessing step in class separability. That is, in this invention, preprocessing (i.e., data augmentation) and also the choice of the time-frequency transformation itself are taken into consideration from the standpoint of class separability.

The paper "Pre-processing spectrogram parameters improve the accuracy of bioacoustic classification using convolutional neural networks", Bioacoustics 2019 by Elly C. Knight et al. is concerned with the use of spectrogram for classification via neural networks of bird sounds. They vary the parameters of the spectrograms to see how the neural network can better classify bird sounds. The points in common between the present invention and this paper are that both is concerned with the impact of the time-frequency transformation parameters on the classification performance. Similar to this invention, the strategy to probe what would be more appropriate parameters to the transformation involves evaluating a collection of candidate parameter values. The present invention differentiates from this paper because here we are considering that the time-frequency transformation can be of any form a priori (not only the Spectrogram, as in the paper). Also, in the paper the choice of an ideal set of Spectrogram parameters is seek given the viewpoint of the classification performance, that is, they search for spectrogram parameters that would improve the classification performance of the signals. Therefore, the parameter search in the paper is linked to the application (classification of bird sounds), whereas the step of time-frequency transformation parameter for this invention is thought from the standpoint of class separability. Finally, this invention also considers the choice of data-augmentation effects, whose search is not considered in the paper.

It has been discussed how in applications of signal classification that involve machine learning models like CNNs, choosing what time-frequency transformation and data augmentation to use is a critical step. Poorly chosen transformations and data augmentation can impact the separability of samples of different classes in the time-frequency space. Therefore, the state of the art lacks an analysis tool to help guide choice of what time-frequency representations and data-augmentation effects to use when processing a given set of input signals, which does not require any previous domain knowledge of prior techniques already been used in a specific classification problem by use of machine learning.

SUMMARY OF THE INVENTION

The presented method is intended to serve as a pre-processing step to build machine learning classifiers for speech signals, which allows the user to choose time-frequency transformations or data-augmentation effects (two important steps in signal machine learning frameworks) that increase class separation in time-frequency feature space, thus facilitating the classification task.

The intent of this invention is to measure such a separability and use it as criterion to find candidate time-frequency transformations and data augmentation effects to use, given the specific speech application and dataset at hand.

It is also an objective of the present invention to provide a tool to evaluate different choices of time-frequency and data augmentation transformations to be applied to speech signals, without having to go through a whole deep learning training procedure.

In order to achieve these objectives, the present invention proposes a computer implemented pre-processing method for facilitating machine learning signal classes separability by evaluating candidate time-frequency transformations to be applied to a set of input speech signals to generate less redundant features. The method includes obtaining M candidates of time-frequency transformation rule for the set of input speech signals, for the M candidates employing the obtained transformations to calculate time-frequency matrices for at least one speech signal of each class within the set of input signals, and assessing class separability in feature space through the minimization of a multi-parameter objective function that takes into account the value of the overlapping between the areas of intra-class and the inter-class distributions of distances between the time-frequency matrices. An intra-class distribution is defined as the distribution of distances from time-frequency matrices of the same class, inter-class distribution is defined as the distribution of distances of different classes, and the multi-parameter objective function is defined as a measure of class separability in feature space, which evaluates the suitability of the candidate time-frequency transformation rule to generate quality time-frequency matrices (2D input features) to be used in a machine learning model.

The present invention also relates to a method for evaluating candidate data-augmentation effects to be applied to input speech signals for time-frequency transformations, using the same criteria above.

One advantage of the method is that it does not depend on a priori domain knowledge, as it evaluates the different feature implementation choices based on a criterion agnostic to the application: the ability of the chosen time-frequency transformation and data augmentation effects to guarantee class separability in a (2D) feature space created for the input speech signals. Also, the present method is independent of the specific model architecture to be employed for the classification task, as evaluations are carried out only at the data level, meaning that what is being evaluated are the feature choices in the light of the available dataset.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is explained in greater detail below on the basis of figures. Shown therein are.

DETAILED DESCRIPTION OF THE INVENTION

Figure 1:
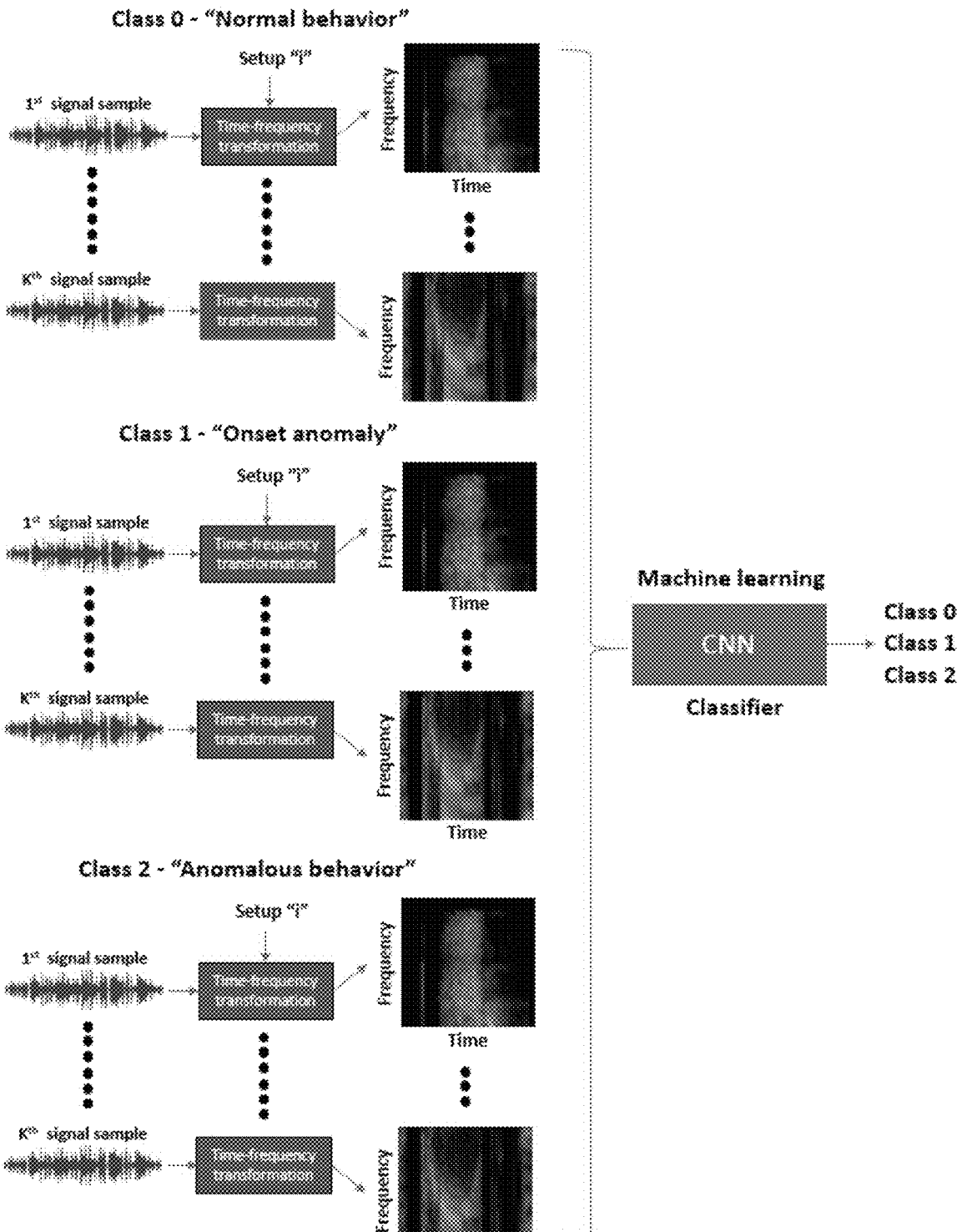
FIG. 1 shows how input data can be coupled to a prototype CNN considering the three desired classes. In this example, a time-frequency transformation that has been adequately chosen can offer more discriminative power in the time-frequency plane (i.e., can better characterize the temporal-dynamics of the frequency content), and greater dissimilarity for time-frequency matrices belonging to different classes, according to an embodiment of the present invention.

This invention proposes a pre-processing step for building machine learning classifiers, which allows the user to choose time-frequency transformations or data-augmentation effects that increase class separation in time-frequency feature space, thus facilitating the classification task.

In order to achieve this, the present invention proposes a computer implemented method for evaluating candidate time-frequency transformations to be applied to a set of input signals, wherein the set of input signals contains input signals of at least two different classes and the candidate time-frequency transformations are to be used in a machine learning model. The method comprising the steps of: i) obtaining at least one candidate time-frequency transformation expression for the set of input signals; ii) computing time-frequency matrices for at least one input signal of each class within the set of input signals; and iii) employing a multi-parameter objective function to compute the area overlap between intra- and inter-class distributions of distances between the time-frequency matrices. The area overlap is a measure of the suitability of the time-frequency transformations to be used in a machine learning model. The smaller overlap area, the more separated are the classes of the input classes.

This way, this invention can measure the class separability and employ it as criterion to find good candidate time-frequency transformations and data augmentation effects to use, given the specific application and dataset at hand.

Below, at least two preferred embodiments, or "modes" of the invention will be described. For the sake of understanding of the present invention, one embodiment is related to the choice of time-frequency representations, and another embodiment is related to the selection of data-augmentation setups to be applied in a given input dataset. It is possible that these two embodiments can co-exist in the same machine learning signal classification system. In such configuration, the present invention refers to the mode of classification of time-frequency representation as "TF rep" mode, which stands for "time-frequency representation" mode. The mode of classification of data augmentation setup is referred as "DAug" mode, which stands for "data augmentation" mode.

In these two preferred embodiments, a dataset of three classes (class 0, class 1, class 2) is used as example below, and some operations refer to a Python library. However, a person skilled in the art will understand that the present invention may be applied in different datasets having different numbers of classes, as well as it is not related to a computer program per se or requires any specific software language to be implemented.

Selection of Time-Frequency Transformation

Depending on the nature of the signals and the classification problem, the choices of time-frequency transformations ("TF rep" mode) and data augmentation effects ("DAug" mode) can play a role in the observed data separability in feature space. In this embodiment, we focus on using the proposed invention to guide the choice of the time-frequency transformation only. More precisely, we use the present methodology for choosing one candidate time-frequency transformation over another, by looking at which candidate transformation generate the model input features (i.e., the time-frequency matrices) more separable in feature space. This strategy could be used in applications in which a CNN-based model is trained over a dataset of time-frequency matrices computed from signals (waveforms) of very distinct nature, and used for the task of classification or pattern recognition.

As an example of an embodiment, let us consider a simpler task of classifying a given time-domain signal x(t) (which can be an audio segment, an EEG record or a bearing vibration waveform, etc.), into the following three classes (categories), according to FIG. 1:

i) normal behavior (class "0"), ii) onset anomaly (class "1"), and iii) anomalous behavior (class "2")

Above, normal behavior (class "0") would characterize signals that are behaving according to what would be expected given their nature, application, or baseline performance. The category onset anomaly (class "1") would correspond to an intermediary, altered situation, where attention should be given to the behavior of the signals, as an anomaly is likely to be onset to occur. The class anomalous behavior would represent the case where an anomalous behavior is already present and manifested in the signal dynamics, characterizing a failure, damage, or incorrect behavior.

These categories are very generic and likely to occur in different situations (i.e., one could think of contexts in which audio, ECG/EEG, vibration, or seismic signals, for example, undergo behaviors that are considered normal, onset and anomalous). A very high-level overview on the idea of using CNN to classify generic waveforms given the classes defined above can be seen in FIG. 1.

Time-frequency representations, which are the 2D "outputs" of time-frequency transformations, describe how the frequency content of the signal varies over time More specifically, let S(t, ƒ) represent a given time-frequency representation obtained by time-frequency transforming the signal x(t), i.e., $$S(t, f) = F\{x(t), \theta\} \quad (1)$$

where $F\{x(t), \theta\}$ denotes the time-frequency transformation itself, which takes as input the signal x(t) and a collection of parameters $\theta[\theta_1, \ldots, \theta_K]$ and transform the signal from the time domain (t) to the time-frequency domain (t,ƒ).

The parameters $\theta_1, \ldots, \theta_K$ here do not necessarily need to be a numerical variable, they can also be sub-functions, categorical variables, or any other piece of information required to transform a given signal from time domain (1D) to time-frequency domain (2D).

The most well-known time-frequency transformation is the Spectrogram, but there are also many others like Wigner-Ville transformation and its variations, the Choix-William and the Rihaczek transformations. Example of parameters can be kernels and window functions and their individual sub-parameters. For instance, a given time-frequency transformation and its parameters can be categorized as follow:

Candidate time-frequency transform: "Spectrogram",
Functional form $$F\{\cdot\} : \left| \int x(s)h(s-t)e^{-i2\pi fs} ds \right|^2 \quad (2)$$

Parameters θ:
Window function: "Hamming", i.e., $$h(t) = 0.54 - 0.45\cos\left(\frac{2\pi t}{N-1}\right) \quad (3)$$

Window size: N=100
Stride: 10
Frequency points: 1024

The pieces of information above categorize a candidate time-frequency transformation, i.e., they tell the user how to transform x(t) into S(t, ƒ) by using a Spectrogram transformation and the provided parameters. Other families of time-frequency transformations may have a different set of parameters θ, in which more or less pieces of information should be provided.

The setup above tells the user how to transform x(t) into a 2D feature (i.e., a matrix) S(t, ƒ) by using a Spectrogram transformation. Other setups for the same transformation (i.e., Spectrogram) can be thought, which will lead to a different time-frequency matrix S(t, ƒ). In practice, the sample setup above can be summarized into a data structure, for instance, like a Python dictionary:

$$setup\_i = \{\text{"window\_functions"} : (\text{"Hamming"},), \quad (4)$$

$$\text{"window\_size"} : 100, \text{"stride"} : 10, \text{"freq\_points"} : 1024\}$$

The rationale behind the proposed invention under the best mode of operation is to test as many setups as in (4) as possible, however a single sample can also be tested.

In FIG. 1, it can be seen that the chosen setup ("setup_i") would control the generation of spectrograms for all classes. These spectrograms will be used as input to the model (model training and testing is not particularly shown in FIG. 1, the idea is to depict only the preprocess part). Before describing how these candidate Spectrogram setups are generated, let us first discuss how the framework can be initialized and what are the steps considered if it were to operate in the best mode.

It is important to note that the spectrogram is just one out of many possibilities one could obtain when choosing from different time-frequency transformations. Other time-frequency transformations, such as Rihaczek transformation, are equally valid.

Figure 2:
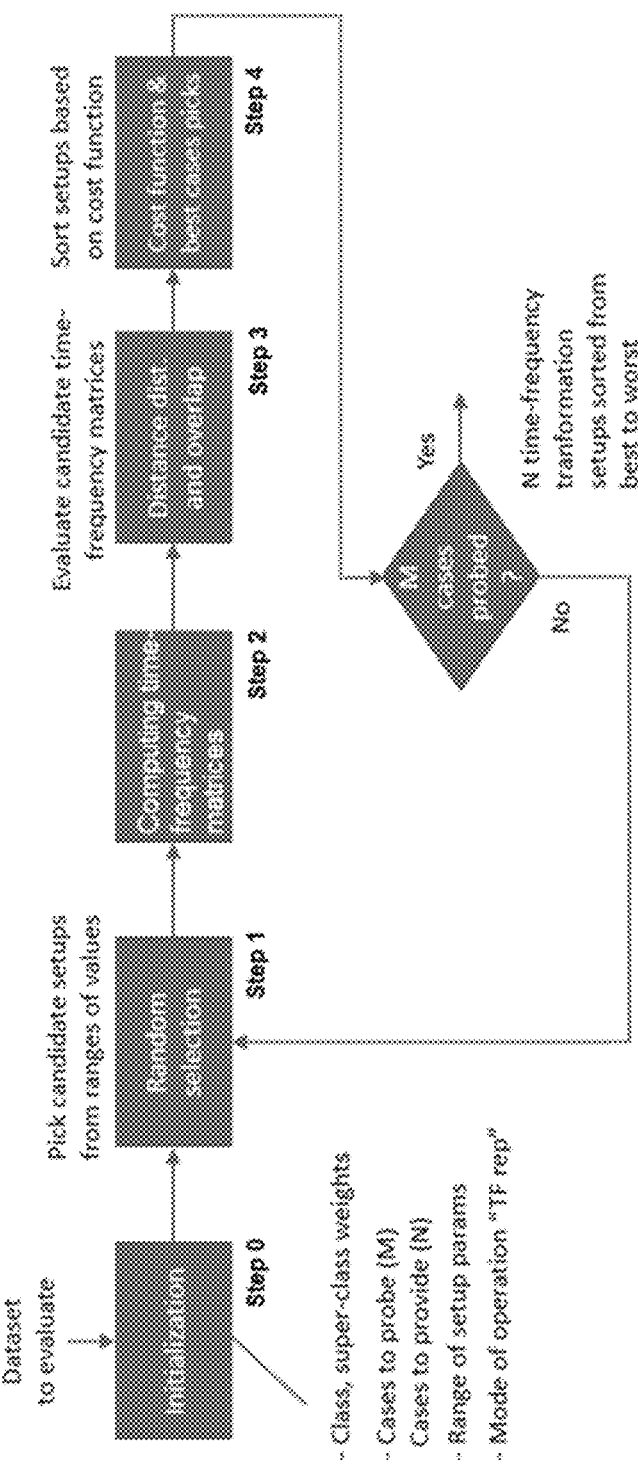
FIG. 2 shows a flowchart of the proposed framework according to an embodiment of the invention (i.e., mode "TF rep").

FIG. 2 shows a flowchart of the steps of the method for classifying time-frequency transformations according to an embodiment of the invention. This scheme stands for the mode of operation "TF rep".

The four steps characterizing the proposed method in such preferred embodiment are I) Initialization, II) Random parameter selection, III) Time-frequency matrices and distance calculations, and IV) Cost function computation and selection of N best cases. Below, more details are given on how the signal samples pass through these steps, allowing us to obtain at the end a list of candidate time-frequency transformations to be used for computing from the (1D) signals the necessary 2D features, which can be used as inputs to machine learning signal classifiers like CNNs.

Step 0—Initialization

The step of initialization is an optional step of the present invention, and may be understood as a step that allows a user to set some parameters of the framework.

For using the proposed framework, one has to determine what dataset will be considered for analysis. One can probe all training signals or just a fraction of them. Regardless of the chosen number of signals to probe, the resulting dataset needs to contain examples of all classes contemplated by the machine learning/CNN classifier.

Having determined the subset of data to analyze, the first step of the procedure is the Initialization block (FIG. 2, Step I). At this step, the user has to provide the pieces of information required to perform the random selection, time-frequency calculations and distance analysis by the framework. The first piece of information that needs to be provided is the number N of cases to return (i.e., the number of time-frequency transformations to give to the user at end of the analysis) and the total number M of randomly selected time-frequency transformation schemes to investigate. These numbers N, M may be provided by a user by means of a user interface or simply predefined. A common choice of parameters could be N=5 and M=1000, for instance.

The next piece of initialization data is the set of weight values to consider when assessing class dissimilarity over all time-frequency matrices computed for the input dataset. For example, the user could decide to give more weight to the candidate time-frequency transformations that better separate classes 2 and 1 ("anomalous behavior" and "onset anomaly", respectively) from class 0 ("normal behavior"), than those transformations that generate time-frequency matrices evenly separated over the three classes. An example on how to declare the initialization variable "class weights" in a Python dictionary structure can be given as $$class\_weights = \{\text{"super\_class"}: \qquad (5)$$
$$\{\text{"anomalous behavior"}: [\text{"onset anomaly"}, \text{"anomalous behavior"}],$$
$$\text{"normal behavior"}: [\text{"normal behavior"}]\},$$
$$\text{"weight\_superclasses"}: 0.5, \text{"weight\_overlap"}: 0.3,$$
$$\text{"weight\_dispersion"}: 0.2\},$$

Where the two super classes chosen are "anomalous behavior" and "normal behavior". The user can define an arbitrary number of super classes, as long as there exist enough class combinations to mount them. The weight values chosen for the super classes will be further used to compute the cost function to evaluate a given candidate time-frequency transformation setup (like the one exemplified in (4)). Similarly, the weight values to consider when evaluating the overlap between distributions of distances from individual/distinct classes and their dispersion can also be determined.

Another part of the initialization step is the determination of the search space for the random selection of the time-frequency transformation free parameters. For the particular case of the Spectrogram transformation, the user needs to specify what possible short-time window expressions could be considered (e.g., Hamming, Hanning, Kaiser, Guassian, etc.), the range of variation of parameters specific for the choice of short-time window, when applicable, (e.g., range of a values for Kaiser window, range of a values for Gaussian window), the range of variation to consider for the window size, the possible choices for number of frequency points, and the range of stride values to consider. For example, this piece of information characterizing a given Spectrogram transformation could be provided as a json file, or a Python dictionary, in the following way:

$$\{\text{"window\_fucntions"}: [(\text{"Hamming"},), (\text{"Hamming"},), \qquad (6)$$
$$(\text{"Kaiser"}, range(0, 30, 100)), (\text{"Gaussian"}, range(0.01, 2, 100))],$$
$$\text{"window\_size"}: range(5, 100, 1),$$
$$\text{"freq\_points"}: range(100, 10000, 1).$$
$$\text{"stride"}: range(10, 500, 1)\},$$

where the "window_functions" key contains a list of function names and parameters defined as tuples, in which each tuple contains the function name (e.g., "Hamming") and the range of variation of the function parameters, when it applies.

The keys "window size", "freq_points", and "stride" contain the range of variation of the window size, frequency points and stride values to consider for random sampling.

The final initialization choice is the framework's mode of operation (i.e., "TF rep" and "DAug"). As previously mentioned in the present invention, an embodiment includes the mode of operation "TF rep".

Step 1—Random Selection of Candidate Time-Frequency Transformations

The first main step of the proposed invention is obtaining M candidates of time-frequency transformations for the set of input signals.

Having initialized the framework, the next step is the random selection of candidate time-frequency transformations (FIG. 2, Step 1), or candidate set of parameters characterizing these transformations, which are ultimately employed to calculate the desired time-frequency matrices (i.e., the model 2D input features) from the available signal dataset. The candidate set of transformation parameters can be randomly drawn from a dictionary like (6), which contains parameter ranges and candidate window functions describing a Spectrogram transformation.

According to the preferred embodiment of the invention, the obtaining M candidates of time-frequency transformations comprises creating the M candidates based on the following parameters:

a base known mathematical transformation expression or a functional form that can be used to transform signals from time domain (1D) to time-frequency domain (2D), either in continuous or discrete fashion, within the following groups of transformations: Spectrogram transformation, Short-time Fourier and its variations transformation, Gabor transformation, Wavelet transformation, Wigner-Ville transformation, Pseudo Wigner-Ville transformation, Bertrand transformation, Chirplet transformation, Cho-Williams transformation, Rihaczek transformation, Page transformation, Born-Jordan transformation, or any other parametric and nonparametric time-frequency transformations;

wherein a parametric time-frequency transformation is considered as the one that assumes a given parametric or statistical model to the input signal or time-frequency spectrum (like the Chirplet transformation), while a nonparametric time-frequency transformation does not make such an assumption (like the Wigner-Ville transformation).

Q the range of variation of any parameters specific to the chosen time-frequency transformation functional form (expression);

the range of variation of the base known transformation expression or functional form itself;

a base known mathematical expression or functional form characterizing the logic followed to window the signal samples, that is, the window functional form itself, within the groups of rectangular window, B-spline windows, polynomial windows, sinusoidal windows, cosine-sum windows, Gaussian and modified-Gaussian windows, DPSS or Slepian windows, exponential windows, hybrid windows, and general parametric adjustable windows the range of variation for the window size;

the range of variation of any parameters specific to the chosen window functional form (expression)

number of frequency points; and the range of values of hop sizes;

wherein the parameters are chosen randomly to create the M candidate time-frequency transformation rules.

Such a set of randomly picked parameters is called a random setup. An example of what a random setup would look like was already given in (4). For each random setup, a quick sanity-check step may be carried out to check if the selected combination of window functions and parameters give time-frequency matrices that are possible to compute.

Step 2—Computing Time-Frequency Matrices

The second main step of the proposed invention is employing the obtained transformations to calculate time-frequency matrices for at least one signal of each class within the set of input signals.

In the second step of the framework (FIG. 2, Step 2), the computations of time-frequency matrices and distribution of distances are carried out. At this step, a given randomly picked setup (say, the i-th setup "setup_i" as in (4)) is first used to compute time-frequency matrices for all signal samples from all classes in the input dataset. Optionally, the framework computes time-frequency matrices for at least one input signal of each class within the set of input signals.

Step 3—Evaluation of Distances Between Time-Frequency Matrices

The third main step of the proposed invention is assessing class separability in feature space through the minimization of a multi-parameter objective function that takes into account the value of the overlapping between the areas of intra-class and the inter-class distributions of distances between the time-frequency matrices.

The intra class is defined as the distribution of distances from time-frequency matrices of the same class, inter-class is defined as the distribution of distances of different classes, and the multi-parameter objective function is defined as a measure of class separability in feature space, which evaluates the suitability of the candidate time-frequency transformation rule to generate quality time-frequency matrices (2D input features) to be used in a machine learning model.

After computing the time-frequency matrices, the distance values between time-frequency matrices from individual signal samples are computed (the distance in this case could be, for example, the Euclidean distance), and used to compute probability distribution of distance values. These distance distributions are organized into those corresponding to distance values between time-frequency matrices of the same class (intra-class distance distributions), and time-frequency matrices of different classes (inter-class sample distances).

The technique used to do so can be within the group of parametric or nonparametric methods, wherein parametric methods to estimate probability distributions are considered as those that need to assume a given parametric or statistical model to the input signal (like the Gaussian mixture model method), while nonparametric methods to estimate probability distributions does not rely on such an assumption (like the histogram method).

More specifically, for this example the intra-class distributions will be:

Distribution of distances values between all spectrograms belonging to the Class 0—"Normal behavior", Distribution of distance values between all spectrograms belonging to the Class 1—"Onset anomaly", Distribution of distance values between all spectrograms belonging to the Class 2—"Anomalous behavior", whereas the inter-class distributions will correspond to Distribution of distances values between all spectrograms belonging to the Class 0—"Normal behavior" and to the Class 1—"Onset anomaly", Distribution of distances values between all spectrograms belonging to the Class 0—"Normal behavior" and to the Class 2—"Anomalous behavior", Distribution of distances values between all spectrograms belonging to the Class 1—"Onset anomaly" and to the Class 2—"Anomalous behavior".

The area overlap between the distributions above are then evaluated, as well as the dispersion (in this case, the variance) of each individual distribution. The dispersion of the intra-class distance distributions in order to account for the individual variability of the within-class samples. With these metrics at hand, a table with overlap and variance values can be computed.

The idea for computing the overlap is that a strong time-frequency transformation setup will generate time-frequency matrices (i.e., spectrograms) are that not alike if the original signal samples belong to different classes, but tend to be similar for signal samples from the same class. Therefore, overall, if we compute a group distributions of distance values between spectrograms of different classes (i.e., the inter-class distance distributions), and another group of distributions of distance values between spectrogram of the same class (i.e., the intra-class distance distributions), the overlapping area between these two groups of distribution will be small in average.

On the other hand, if we end up selecting a poor time-frequency transformation, the spectrograms of signal belonging to different classes will tend to be similar, and the overlap area between inter-class and intra-class distributions of spectrogram distances will be higher. Hence, by monitoring the average overlap area between intra-class and inter-class distribution of spectrogram distances, we can assess the quality of the setup randomly selected for generating that spectrograms.

Figure 3:
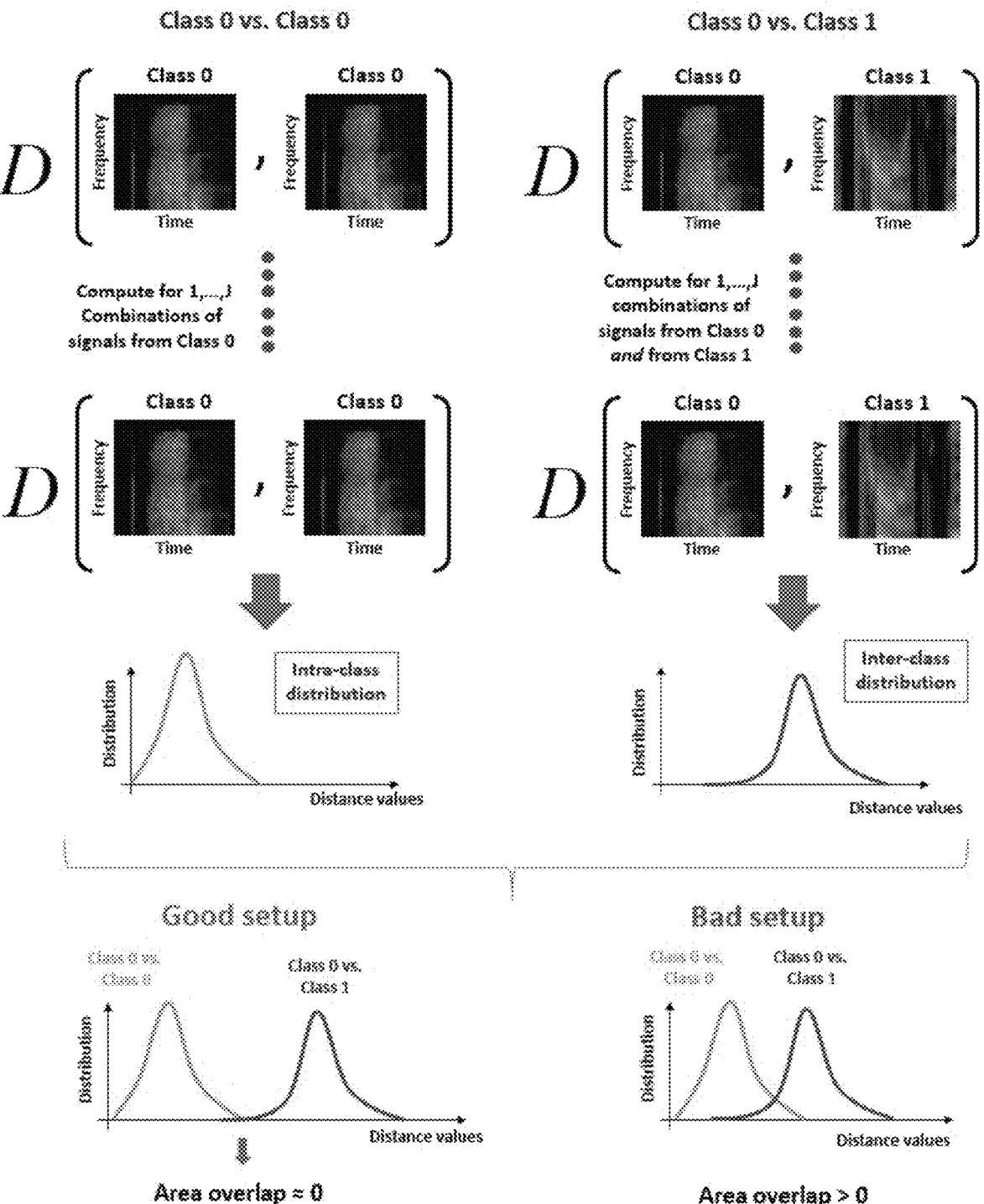
FIG. 3 shows Example of the analysis of intra-class and inter-class distributions of distances, according to an embodiment of the present invention.

An example of this methodology is depicted in FIG. 3, which shows a distance function $D(\cap,\cap)$ (e.g., the Euclidean distance) being computed between spectrograms from signals from the same and different classes. Batches of $1, \ldots, J$ signals are selected from the data (one does not need to consider the full dataset for computations). From the computed distances, intra- and inter-class probability distributions can be computed. To assess the quality of the candidate time-frequency transformation setup used to compute the spectrograms (e.g., the setup in (4)), the area overlap between the distributions can be considered.

In an alternative embodiment of the invention, it is desirable to also evaluate the intra-class dispersion that a given time-frequency transformation setup causes. More specifically, in the scenario where all the signals belonging to a given class are equal, the intra-class spectrogram distances will be zero, and the overlap between intra- and inter-class distribution of distances will also be zero. If we have signals that are very much alike, we can also have intra-class distribution very close to zero, which will bias the overlap metric towards zero as well. The same situation will happen if the randomly selected setup ends up somehow computing approximately the same time-frequency matrix regardless of the input signal. To avoid such cases, one can compute the variances of the intra-class distributions and use their values as regularization parameter in combination with the overlap values. Thus, a strong candidate for time-frequency setup will be the one that can preserve the intra-class variability of the dataset, but can ensure the classes are nevertheless separable in time-frequency space.

Finally, we note that for computing the intra-class and inter-class distribution of spectrogram distances and the corresponding overlap and dispersion values, it is not always necessary to calculate the distance values for all spectrograms of all classes. In general, it would take an impractical amount of time to calculate all distances values for all combination of signals from different classes. On the other hand, we have observed that, if we calculate the distances iteratively in batches, that is, if we divide the signals from the different classes into smaller random chunks (say, 1, . . . , J chunks as in FIG. 3), compute their spectrograms using the candidate setup and evaluate the distance and overlap values, after a certain number of chunks the distance distribution shapes and the overlap metric tend not to change anymore. In other words, one can have a good estimation of the distance distributions that would be obtained by using the whole dataset for the computations by sub-sampling a much smaller batch of data from the original set of signals.

Step 4—Ranking—Objective Function and Selection of Best Cases

Step 4 is an optional step in the preferred embodiment of the invention, wherein multiple time-frequency transformations are evaluated in order to provide, as an output a number of best cases for use in a machine learning model.

However, in a general application of the invention wherein a single time-frequency transformation is evaluated, the area overlap can be used a measure of the suitability of the time-frequency transformations to be used in a machine learning model.

Regarding Step 4 in FIG. 2, having computed the overlap between distributions and their dispersion, we go to the last and fourth major step of the framework, where the cost function to evaluate individual setups is computed. The cost function we propose makes use of the class and super class weights defined in the Initialization step.

Preferably, the objective function is calculated by employing any mathematical expression that algebraically combines a vector of real-valued weights and a vector of metrics computed from the statistics of distances distribution, such as distribution area overlaps and distribution dispersion. The expression of the objective function is in the form of a dot product of a vector $w$ of P weights $w=[w_0, \ldots, w_{P-1}]$ and a vector $m$ of Q metrics $m=[m_0, \ldots, m_{Q-1}]$ $$f = w \cdot m \qquad (7)$$

A possible configuration for the vector of weights can be $w=[w_0, w_1, w_2]$, with $w_0$, $w_1$, and $w_2$ being real-valued constants. Also, a possible configuration for the vector of metrics can be $m=[m_0, m_1, m_2]$, with $m$, $m_1$, and $m_2$ being equal to $$m_0 = \text{mean(overlap super classes)},$$

$$m_1 = \text{mean(overlap different classes)},$$

$$m_2 = \text{mean}(1/\text{dispersion individual classes}),$$

Therefore, a possible expression for objective function $f$ following the dot-product form with vector of weights $w$ and vector of metrics $m$, $$f = w_0 * \text{mean(overlap super classes)} + \qquad (8)$$
$$w_1 * \text{mean(overlap different classes)} + \backslash w_2 *$$
$$\text{mean}(1/\text{dispersion individual classes}),$$

where the weights $w_0$, $w_1$, and $w_2$ are determined in the initialization variable "class weights" (see (5)) in the fields "weight superclasses", "weight overlap", and "weight dispersion", respectively.

It is preferred that the cost function in (8) be as close to zero as possible. More specifically, as the distance values between spectrograms of different classes (and super classes) increase in comparison to the distance values naturally found for spectrograms of the individual class, we have that:

$$w \qquad (9)$$
$$w_0 \times \text{mean(overlap super classes)} +$$
$$w_1 \times \text{mean(overlap different classes)} \to 0$$

On the other hand, as discussed in Step 3, we should preferably avoid the corner case of having all spectrograms of the same class nearly equal to each other, since in this case the intra-class distance distributions will tend to peak close to zero with very low dispersion (as all distances will be close to zero), and the expression above will also tend to zero. Therefore, to avoid this situation, we included $w_2 * \text{mean}(1/\text{dispersion individual classes})$ to act like a regularization term for the cost function. With this term, we will be also favoring setups that can maintain a given intra-class variability for the time-frequency matrices (spectrograms). This situation is analogous to the well-known criterion to find optimal partitions in clustering applications, in which one wants to build groups that maximize internal (within-cluster) variability, while maximizing the distance between cluster centroids.

Having computed the value of the cost function for the current setup, the framework then repeats the procedure from Step 1 (random selection of candidate time-frequency transformations) onwards, randomly selecting 1, . . . , M setups, computing the corresponding time-frequency matrices, their intra- and inter-class distance distributions, overlap, dispersion and cost function values.

Out of the M setups (i.e., the ones giving the smallest cost function values) one can be selected a short list of N candidates representing the best cases in terms of cost function values.

These best N setups can then be used as candidate ones for building time-frequency matrices from the signal dataset.

Selection of Data Augmentation Effects

In the description of an embodiment, it was presented a first functionality made possible by the present invention, that is, the selection of time-frequency transformation regarding their suitability for use in a machine learning model.

The proposed manner involved the case where a CNN is used to classify signals (waveforms, in general), which could be classified in generic classes describing "normal", "onset anomaly", and "anomalous behavior". The goal was to use the invention to obtain a list of candidate spectrogram setups, which could ensure a certain class separability while maintaining the intra-class variability. The obtained setups could be used to create 2D features to develop the machine learning classifiers for the desired waveforms.

The alternate solution described here is based on the same core concepts of class separability, dissimilarity of time-frequency matrices, distances and distribution area overlaps, but this solution is focused on finding best data augmentation candidate setups to transform the original signals.

Data augmentation is a setup that is often adopted by many machine learning practitioners to help the developed models to generalize better, especially when these models are to be employed to classify real-world signals. However, as commented previously, the choice itself of the data augmentation can affect the data separability in feature space. The idea is that the features (e.g., the spectrograms) to be computed from the data-augmented signal will be processing not the original signal, but the one already transformed by the data augmentation effect. Therefore, a poorly chosen data augmentation effect can end up degrading the time-frequency matrices (the features) of the transformed signal, by making the less separable in the feature space (for more details, see discussions in the previous section).

Here, we describe how the proposed methodology can be used to selected data augmentation effects, after a given time-frequency transformation setup has been chosen. The setup could have been chosen using this invention under an embodiment, or considering some a priori domain knowledge about the problem. Regardless of the manner the best time-frequency transformation setup was obtained, here it will be considered that this setup is fixed, and parsed as initialization parameter together with the other ones. This mode of operation is named "DAug", and can be selected as an initialization step, as described ahead.

Figure 4:
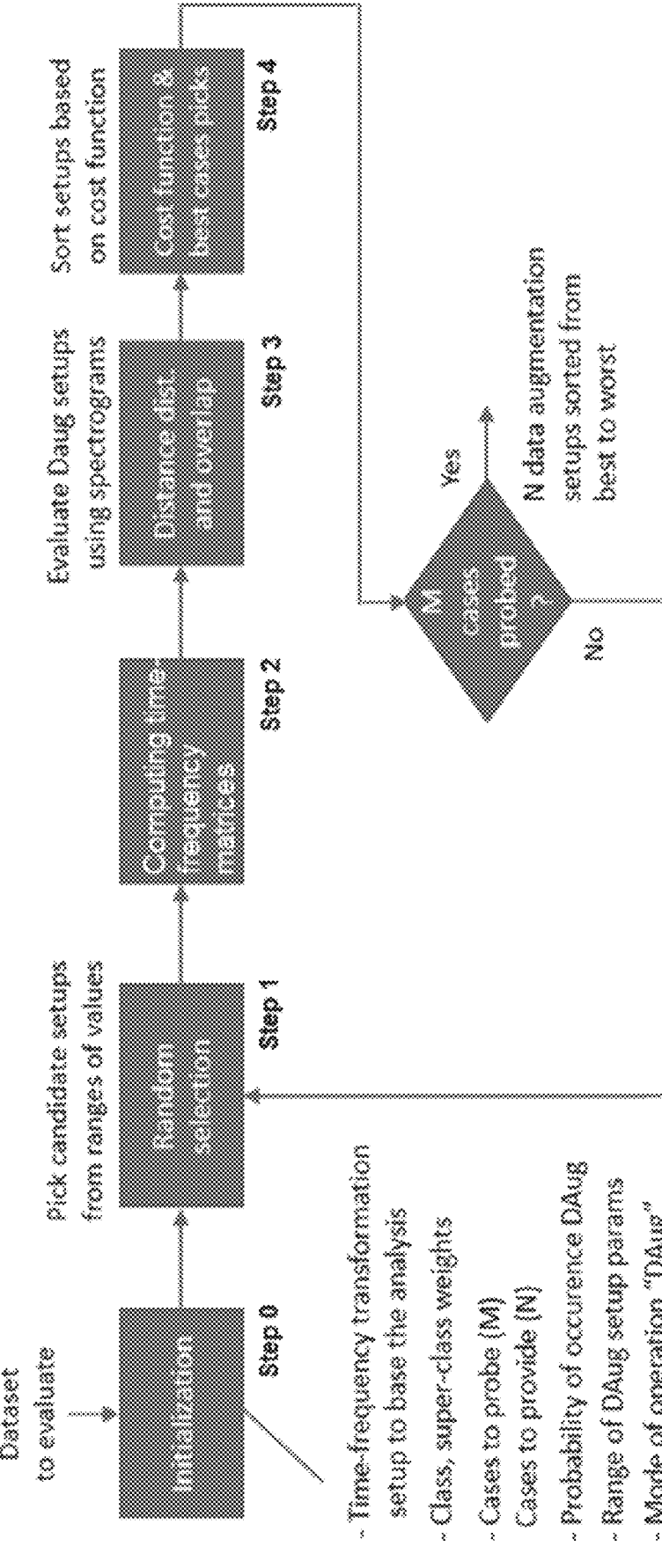
FIG. 4 shows the flowchart of the proposed framework according to an embodiment of the invention (i.e., mode "DAug").

We remark that in this section we will highlight mainly the differences between the best ("TF rep") and the alternate ("DAug") modes, as the core of the solution and the main elements and ideas will remain the same. In FIG. 4, the four major step of the solution operating in the alternate mode are shown. Note that the core of the methodology remains unaltered.

Step 0—Initialization

The necessary inputs to the initialization part is shown in FIG. 4, Step I. As in the case for the best mode of operation ("TF rep"), in the alternate mode ("DAug") the user has to specify the numbers M and N of random setups to probe and setups to output, respectively. The super classes to consider and the chosen class weights are also defined in the same manner as in (5). Note that the main difference between FIG. 2 and FIG. 4 for Step I, is that for the latter the user needs to specify the fixed time-frequency transformation setup that will be used. This fixed setup will be adopted for basing the analysis of the candidate data augmentation effects. That is, the quality of a data-augmentation transformation over another will be assessed considering its effects in the spectrogram computed by using the fixed setup. Example of such a fixed, a priori setup can be seen below $$\text{setup}_{fixed} = \{\text{"window\_functions"} : (\text{"Hanning"}), \qquad (10)$$

$$\text{"window\_size"} : 30, \text{"stride"} : 10, \text{"freq\_points"} : 512\}$$

Having defined the a-priori time-frequency transformation setup to base the data-augmentation analysis, the next step of the initialization part is determining the probability of occurrence of each data augmentation effect to consider (i.e., the initialization "Probability of occurrence DAug" in FIG. 4). This piece of information can be parsed as a Python dictionary, listing all possible probability values for each super-class defined in the input "Class, super-class weights", which is defined in this alternate mode in the same manner as (5). Example of the Python dictionary with data augmentation effect probabilities is shown below

```
{
  "super classes": {
    "normal behavior": {
      "daug_effect1_prob": range(0,25, 1.00, 4),
      "daug_effect2_prob": range(0,25, 1.00, 4)},        (11)
    "anomalous behavior": {
      "daug_effect1_prob": range(0,25, 1.00, 4),
      "daug_effect2_prob": range(0,25, 1.00, 4)}
}}
```

In (11) the range of probabilities of occurrence for the two (generic) data augmentation effects considered are the same across the super classes "normal behavior" and "anomalous behavior", but it could be set differently. In practice, these probabilities control the fraction of signal samples in the dataset to evaluate that will undergo the desired data augmentation effect. For example, if in the random selection step (the next stage of the flowchart in FIG. 4), it is (randomly) selected that "daug_effect1" should occur with a probability of p=0.25 for super class "normal behavior", it means that 25% of the signal samples belonging to this super class will be randomly picked to undergo "daug_effect1". Likewise, if the probability of occurrence sampled from the range of possible value is p=1.00, then 100% of the "normal behavior" samples will undergo "daug_effect1". The random selection of samples to undergo a given data augmentation effect is determined via a binomial experiment with probability p.

Another piece of information that should be defined in the initialization step of the alternate mode "DAug" is the range of variation of individual parameter controlling the data augmentation effects. This refers to "Range of DAug input parameters" in FIG. 4. Like (11), this piece of information can be parsed as a Python dictionary like

```
{
  "class_category": {
    "normal behavior": {
      "daug_effect1": {"param1": range(-4, 4, 100), "param2": range(1,5, 100), "param3":
range(1,4,100)},
      "daug_effect2": {"param1": range(5, 30, 50), "param2": range(2,10, 20)}},        (12)
    "anomalous behavior": {
      "daug_effect1": {"param1": range(-4, 4, 100), "param2": range(1,5, 100), "param3":
range(1,4,100)},
      "daug_effect2": {"param1": range(5, 30, 50), "param2": range(2,10,20) }}}
```

Like (11), the ranges of parameter variation for the two super classes are considered the same in (12) for the data augmentation effects considered as example. The values of "param1", "param2", etc., can control aspects specific to the data augmentation effects. For example, if "daug_effect2" was addition of background noise, "param1" could be the specific SNR range considered for noise mixing, whereas "param2" could be the data multiplying factor to consider in the data augmentation operation.

search space for the chosen random selection algorithm search space for the chosen random selection algorithm to pick a candidate augmenting rule (i.e., effect of the data-augmentation method).

Example of a randomly-sample data augmentation method given as a Python dictionary is shown below.

```
setup_daug_i = {
  "class_category": {
    "normal behavior": {
    "daug_effect1": {"prob_occurence": 0.25, "param1": −4, "param2": 4, "param3": 3},
    "daug_effect2": {"prob_occurence": 0.50, "param1": 10, "param2": 2}},          (13)
    "anomalous behavior": {
    "daug_effect1": {"prob_occurence": 0.25, "param1": −4, "param2": 4, "param3": 3},
    "daug_effect2": {"prob_occurence": 0.50, "param1": 10, "param2": 2}}}}
```

Step 1—Random Selection of Candidate Transformations of the Data-Augmentation Method

The step of random selection for the alternate mode is intended to randomly select a data-augmentation transformation setup, not a time-frequency transformation setup. A data-augmentation transformation setup is sampled from (11) and (12) and tells how the framework under the "DAug" mode should process the signal samples via data augmentation.

Preferably, the step of obtaining M candidates of data-augmentation effects comprises creating the M candidates based on the following parameters:

a probability of occurrence p for a particular data-augmentation effect to applied to the set of input signals belonging to different classes, wherein a particular data-augmentation effect is selected according to the probability of occurrence p by considering any rule of random selection;

an augmenting rule outlining the augmentation transformation procedure that each input signal will undergo, which will be representative of the desired data-augmentation effect to be applied to the set of input signals, wherein each augmenting rule can be characterized by a particular collection of parameters, algorithms, or mathematical expressions (functional forms), which describe how to transform the input signals and generate their augmented versions. The augmenting rule can be chosen from a group of pre-defined rules by using any rule of random selection, wherein each rule is characterized by a collection of parameters, algorithms, or mathematical expression;

wherein the collection of parameters, algorithms, or mathematical expressions can include explicit formulas to modify the signal according to any nonlinear criterion (nonlinear transformations), statistical parameters to generate random background noise to be added to the signals, signal-to-noise ratio (SNR) dictating how these background noises will be added to the signals, filter algorithms and parameters to process input signals at different frequency ranges, parameters necessary to carry out any sort of statistical processing of the input data, and multiplying factor representing how many times the same effect (augmenting rule) is to be applied to the same set of signals;

wherein the multiplying factor also controls how many signal replicas a particular augmenting rule will generate;

a range of variation for the parameters, algorithms, or mathematical expression characterizing each rule of the data augmenting method, which can be regarded as a where "i" is used to denote the i-th or a generic random data-augmentation setup. In (13), the user is telling the framework to apply "daug_effect1" and "daug_effect2" to 25% and 50% of the signal samples, respectively, and use the specific param1 to param3 to perform the data augmentation operations.

This data-augmentation transformation setup can be named DAug arbitrarily according to the user

Steps 2 and 3—Computing Time-Frequency Matrices and Evaluation of Distances Between Time-Frequency Matrices Undergoing or not the Data Augmentation (DAug) Setup

Similarly to the previous step, the evaluation of the randomly selected setups is slightly different from the one carried out in an embodiment. Here, we want to evaluate the average effect that a given data-augmentation setup such as (13) has on the time-frequency matrices compute via (10).

More specifically, the goal is to evaluate that, if by making the signal samples undergo a data-augmentation procedure governed by the selected random data-augmentation setup, the spectrograms of the augmented signals will in the average be less alike among different classes than they originally were for the original (not augmented) signals. For example, a poor data augmentation effect that makes all signals from different classes look the same as they were from the same class, will have the effect of suppressing the dissimilarity observed across spectrograms of distinct classes in the original dataset, making the distance values between inter-class spectrograms decrease. The expected effect is an increase between the area overlap of the intra- and inter-class distribution of distance between spectrograms.

On the other hand, if a good candidate data-augmentation setup has the effect of making spectrograms of different classes more dissimilar in comparison to the original, not augmented dataset, while maintaining the intra-class similarity of the spectrograms, then the inter-class distances values will tend to increase, thus reducing the overlap area between intra- and inter-class distribution of distance values. Thus, a similar overlap criterion as in Steps 2 and 3 for an embodiment can be used to evaluate the potential of a given data-augmentation setup to improve (or deteriorate) the class separability in comparison to what was observed in the scenario where no data augmentation was applied.

Step 4—Ranking—Cost Function and Selection of Best Cases

The rest of the framework also remains similar to an embodiment. The cost function is computed to evaluate each setup (in this case, data-augmentation setup) in terms of intra- and inter-class distribution overlap and within-class variance. This metric evaluates class separability for a given data augmentation effect. The best N data-augmentation setups out of the M chosen for analysis are then returned as output.

Hardware Implementation

The example embodiments described herein may be implemented using hardware, software or any combination thereof and may be implemented in one or more computer systems or other processing systems. Additionally, one or more of the step described in the example embodiments herein may be implemented, at least in part, by machines. Examples of machines that may be useful for performing the operations of the example embodiments herein include general purpose digital computers, specially-programmed computers, desktop computers, server computers, client computers, portable computers, mobile communication devices, tablets, and/or similar devices.

For instance, one illustrative example system for performing the operations of the embodiments herein may include one or more components, such as one or more microprocessors, for performing the arithmetic and/or logical operations required for program execution, and storage media, such as one or more disk drives or memory cards (e.g., flash memory) for program and data storage, and a random-access memory, for temporary data and program instruction storage.

Therefore, the present also related to system for evaluating candidate time-frequency transformations or data-augmentation effects to be applied to a set of input signals, wherein the set of input signal contains input signal of at least two different classes and the candidate time-frequency transformations are to be used in a machine learning model. The system comprising a processor and a memory comprising computer readable instructions that, when performed by the processor, causes the processor to perform the method steps previously described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android and the like, and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source, or transforming data/information from one format into another format. The embodiments described herein are not to be construed as being limited for use with any particular type of server computer, and that any other suitable type of device for facilitating the exchange and storage of information may be employed instead.

Software embodiments of the illustrative example embodiments presented herein may be provided as a computer program product, or software, that may include an article of manufacture on a machine-accessible or non-transitory computer-readable medium (also referred to as "machine-readable medium") having instructions. The instructions on the machine accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions.

Therefore, the present invention also relates to a non-transitory computer readable storage medium for evaluating candidate time-frequency transformations or data-augmentation effects to be applied to a set of input signals, wherein the set of input signal contains input signal of at least two different classes and the candidate time-frequency transformations are to be used in a machine learning model. The storage medium comprising computer readable instructions that, when performed by the processor, causes the processor to perform the method steps previously described in this disclosure.

The techniques described herein are not limited to any particular software configuration. They may be applicable in any computing or processing environment. The terms "machine-accessible medium", "machine-readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Technical Effect

The present invention proposes a tool for evaluating candidate time-frequency transformations or data-augmentation effects to be applied to a set of input signals, wherein the set of input signal contains input signal of at least two different classes and the candidate time-frequency transformations are to be used in a machine learning model.

As discussed, poorly chosen time-frequency transformation setups and data augmentation effects can end making input 2D features (i.e., the time-frequency matrices) that are too similar among themselves, thus compromising class separability in feature space. Also, signal representation choices and data augmentation are selected based on domain knowledge or after time-consuming training and testing rounds of deep learning models.

The proposed solution provides feature extraction/processing schemes that are independent of the knowledge domain (i.e., class separability). Thus, the search for candidate time-frequency transformation and data augmentation depends on the signal set at hand, not the model. As a consequence, the user is not required to actually train the model for assessing these preprocessing choices, which can be time saving in deep learning applications.

These candidate transformations are obtained through a repeated-selection process, in which function expressions/parameters are randomly selected from a set of potential candidates. Time-frequency matrices are computed and stored for all input signals and their data-augmented versions. Distances between these time-frequency matrices are computed and represented as probability distributions. The overlapping area between intra- and inter-class distributions is measured by an objection function specially designed to this end, and is used as criterion to evaluate class separation in time-frequency domain. Finally, the candidate time-frequency or data-augmentation transformations are sorted according to the objective function values and the N best transformations are provided to the user.

The application areas include the processing of different type of signals and waveforms in the areas: NLP and environmental sounds classification (audio), Medical diagnosis (ECG/EEG), Industry (vibration) and Geology (seismic signals).

The machine learning pipeline here can be seen as a generic tool, which can encompass the tasks of training, detection or any other related task. The focus of this invention is on the method itself, which can be implemented as algorithm running either on a sever or on (embedded) device. Therefore, the proposed technique is not intended to become a physical product per say, but to serve as building block of routines and procedures for helping the development and operation of machine learning models. The procedure described therein can also be seen as a pre-process step of algorithms used in machine learning frameworks dealing with the classification of signals.

While various example embodiments have been described above, it should be understood that they have been presented by way of example, and not limitation. It will be apparent to persons skilled in the relevant art(s) that various changes in form and detail can be made therein.

What is claimed is:

1. A computer implemented pre-processing method for evaluating candidate time-frequency transformations to be applied to a set of input time-variant speech signals to improve performance of machine learning models specifically applied to speech signal classification, the computer implemented pre-processing method comprising:

obtaining M candidates of time-frequency transformation rules for the set of input speech signals, the time-frequency transformation rules to be applied specifically to speech signals;

the obtaining includes, for the M candidates, employing obtained time-frequency transformations to calculate matrices for at least one speech signal of each class within the set of input speech signals, and assessing class separability in feature space through a minimization of a multi-parameter objective function that considers a value of overlapping between areas of an intra-class distribution and an inter-class distribution of distances between the calculated time-frequency matrices, applying, as an input to a machine learning model configured to classify the set of input speech signals into different signal classes, time-frequency transformation and data augmentation effects chosen as suitable from among the obtained M candidates based on the assessing of the class separability in the feature space, wherein the intra-class distribution is defined as a distribution of distances from time-frequency matrices of the same class, the inter-class distribution is defined as a distribution of distances of different classes, and the multi-parameter objective function is defined as a measure of class separability in feature space, which evaluates the suitability of a candidate time-frequency transformation rule to generate quality time-frequency matrices (2D features) to be used as the input to the machine learning model being used in tasks involving speech classification.

2. The computer implemented pre-processing method according to claim 1, wherein the obtaining M candidates of time-frequency transformation rules comprises creating the M candidates based on the following parameters:

a base known mathematical transformation expression or a functional form to be used to transform signals from time domain (1D) to time-frequency domain (2D), either in continuous or discrete fashion, within the following groups of transformations: Spectrogram transformation, Short-time Fourier and its variations transformation, Gabor transformation, Wavelet transformation, Wigner-Ville transformation, Pseudo Wigner-Ville transformation, Bertrand transformation, Chirplet transformation, Cho-Williams transformation, Rihaczek transformation, Page transformation, Born-Jordan transformation, or any other parametric and nonparametric time-frequency transformations, wherein a parametric time-frequency transformation is considered as the one that assumes a given parametric or statistical model to an input signal or time-frequency spectrum, while a nonparametric time-frequency transformation does not assume a given parametric or statistical model to an input signal or time-frequency spectrum, a range of variation of any parameters specific to a chosen time-frequency transformation functional form, a range of variation of the base known transformation expression or functional form, a base known mathematical expression or functional form characterizing a logic followed to window signal samples including a window functional form within groups of rectangular window, B-spline windows, polynomial windows, sinusoidal windows, cosine-sum windows, Gaussian and modified-Gaussian windows, DPSS or Slepian windows, exponential windows, hybrid windows, and general parametric adjustable windows, a range of variation for a window size, a range of variation of any parameters specific to a chosen window functional form, a number of frequency bins, and a range of values of hop sizes, wherein parameters are chosen randomly to create the M candidate time-frequency transformation rules.

3. The computer implemented pre-processing method according to claim 1, wherein the assessing class separability in feature space comprises:

computing distance values between time-frequency matrices from signal samples, and estimate a probability distribution of the distance values using a technique within a group of parametric or nonparametric methods.

4. The computer implemented pre-processing method according to claim 3, wherein a distance output is a real value.

5. The computer implemented pre-processing method according to claim 1, wherein, for a set of input speech signals containing I classes, the assessing class separability in feature space comprises:

estimating an intra-class distribution of distances values between time-frequency matrices belonging to each of the 1, . . . , I classes, and estimating an inter-class distribution of distances values between time-frequency matrices belonging to different classes out of the 1, . . . , I classes, wherein the method further comprises:

computing an area overlap between the intra-class distribution and the inter-class distribution of distances, and computing a metric that estimates a dispersion of each of intra-class distributions.

6. The computer implemented pre-processing method according to claim 5, further comprising:

estimating the dispersion of the intra-class distributions and using corresponding values as regularization parameters in combination with the area overlap values.

7. The computer implemented pre-processing method according to claim 1, wherein the employing obtained transformations comprises:

dividing the set of input speech signals from different classes into smaller chunks built by using any rule of random selection, and computing time-frequency matrices by using the candidate time-frequency transformation rule for the chunks built by using any rule of random selection.

8. The computer implemented pre-processing method according to claim 1, further comprising:

assigning different weights to specific classes to give more or less importance when computing the multi-parameter objective function.

9. The computer implemented pre-processing method according to claim 1, further comprising:

creating at least one superclass for the set of input speech signals, wherein the at least one superclass is defined as an aggregating class containing at least two classes from the set of input speech signals, and assigning weights to each of superclasses.

10. The computer implemented pre-processing method according to claim 1, wherein the multi-parameter objective function is calculated by employing any mathematical expression that algebraically combines a vector of real-valued weights and a vector of metrics computed from statistics of distance distributions including distribution area overlaps and distribution dispersion, wherein the expression of the multi-parameter objective function is in a form of a dot product of a vector w of P weights $w=[w_0, \ldots, w_{P-1}]$ and a vector m of Q metrics $m=[m_0, \ldots, m_{Q-1}]$ $$f = w \cdot m$$

wherein a possible configuration for the vector of weights is $w=[w_0, w_1, w_2]$, with $w_0$, $w_1$, and $w_2$ being real-valued constants, wherein a possible configuration for the vector of metrics is $m=[m_0, m_1, m_2]$, where m, $m_1$, and $m_2$ are the averages:

$$m_0 = \text{mean(overlap superclass distance distributions)},$$

$$m_1 = \text{mean(overlap different\_class distance distributions)},$$

$$m_2 = \text{mean}\left(\frac{1}{\text{dispersion individual\_class distance distributons}}\right),$$

wherein a possible expression for objective function $f$ following the dot-product form with vector of weights w and vector of metrics m, is $$f = w0 * m_0 + w1 * m_1 + w2 * m_2$$

wherein the weights $m_0$, $m_1$, and $m_2$ are the class weights for the classes, superclasses and the dispersion between individual classes, respectively.

11. The computer implemented pre-processing method according to claim 1, further comprising:

sorting candidate time-frequency transformation rules from best to worst options given the values obtained by the multi-parameter objective function.

12. The computer implemented pre-processing method according to claim 1, further comprising returning, as an output, a list with the top N candidate time-frequency transformation rules giving largest class separation in time-frequency (2D) feature space, as assessed by the multi-parameter objective function, for a provided dataset, wherein N is an integer number predefined or provided by a user.

13. A system for facilitating machine learning signal classes separability by evaluating candidate time-frequency transformations or data-augmentation method effects to be applied to a set of input speech signals to generate less redundant features, comprising:

a processor; and a memory including computer readable instructions that, when executed by the processor, causes the processor to perform the method as defined in claim 1.

14. A non-transitory computer readable storage medium, which stores computer readable instructions that, when executed by a processor, causes the processor to perform the method as defined in claim 1.

15. A computer implemented method for evaluating candidate data-augmentation effects to be applied to a set of input time-variant speech signals to improve performance of machine learning models specifically applied to speech signal classification, the computer implemented method comprising:

obtaining M candidates of data-augmentation effect for the set of input speech signals;

the obtaining includes, for all M candidates, using at least one candidate data-augmentation effect to create an augmented set of speech signals, computing time-frequency matrices for at least one speech signal of each class within the augmented set of signals, using a predefined time-frequency transformation that is usually applied to speech signals, assessing how candidate data-augmentation effects impact class separability in feature space by employing a multi-parameter objective function that considers a value of overlapping area from an intra-class distribution and an inter-class distribution of distances, applying, as an input to a machine learning model configured to classify the set of input speech signals into different signal classes, time-frequency transformation and data augmentation effects chosen as suitable from among the obtained M candidates based on the assessing of the class separability in the feature space, wherein the intra-class distribution is defined as a distribution of distances from time-frequency matrices of the same class, the inter-class distribution is defined as a distribution of distances of different classes, and the multi-parameter objective function is defined as a measure of the suitability of the data-augmentation effect to be applied to the input speech signals that undergo a time-frequency transformation prior to be processed by the machine learning model.

16. The computer implemented method according to claim 15, wherein the obtaining M candidates of data-augmentation effects comprises creating the M candidates based on the following parameters:

a probability of occurrence p for a particular data-augmentation effect to applied to the set of input speech signals belonging to different classes, wherein a particular data-augmentation effect is selected according to the probability of occurrence p by considering any rule of random selection, an augmenting rule outlining an augmentation transformation procedure that each input speech signal will undergo, which will be representative of a desired data-augmentation effect to be applied to the set of input speech signals, wherein each augmenting rule characterized by a particular collection of parameters, algorithms, or mathematical expressions, which describe how to transform the input speech signals and generate corresponding augmented versions, the augmenting rule being chosen from a group of pre-defined rules by using any rule of random selection, wherein the collection of parameters, algorithms, or mathematical expressions include explicit formulas to modify the signal according to any nonlinear criterion, statistical parameters to generate random background noise to be added to the signals, signal-to-noise ratio (SNR) dictating how these background noises will be added to the signals, filter algorithms and parameters to process input speech signals at different frequency ranges, parameters necessary to carry out any sort of statistical processing of the input data, and multiplying factor representing how many times the same effect is to be applied to the same set of signals, wherein the multiplying factor also controls how many signal replicas a particular augmenting rule will generate, wherein a range of variation for the parameters, algorithms, or mathematical expression characterizing each augmenting rule, is regarded as a search space for the chosen random selection algorithm to pick a candidate augmenting rule.

17. The computer implemented method according to claim 15, wherein the assessing class separability in feature space comprises:

computing the distance values between time-frequency matrices from individual signal samples, and estimating a probability distribution of the distance values using a technique within a group of parametric or nonparametric methods.

18. The computer implemented method according to claim 17, wherein distance output is a real value.

19. The computer implemented method according to claim 15, wherein, for a set of input speech signals containing I classes, the assessing class separability in feature space comprises:

estimating an intra-class distribution of distances values between all spectrograms belonging to each of the 1, . . . , I classes, estimating an inter-class distribution of distances values between all spectrograms belonging to different classes out of the 1, . . . , I classes, wherein the method further comprises:

computing the area overlap between the intra-class distribution and the inter-class distance distribution, and computing a metric that estimates the dispersion of each of intra-class distributions.

20. The computer implemented method according to claim 1, further comprising:

estimating the dispersion of the intra-class distributions and use corresponding values as regularization parameters in combination with the area overlap values.

21. The computer implemented method according to claim 15, wherein the assessing class separability in feature space comprises:

dividing the set of input speech signals from different classes into smaller random chunks built by using any rule of random selection, and computing time-frequency matrices using signals augmented by means of the candidate data-augmentation effect for only the smaller random chunks built by using any rule of random selection.

22. The computer implemented method according to claim 15, further comprising:

assigning different weights to specific classes aiming to give more or less importance when computing the multi-parameter objective function.

23. The computer implemented method according to claim 15, further comprising:

creating at least one superclass for the set of input speech signals, wherein the at least one superclass is defined as an aggregating class containing at least two classes from the set of input speech signals, wherein the method further comprises assigning weights to each of superclasses.

24. The computer implemented method according to claim 23, wherein the multi-parameter objective function is calculated by employing any mathematical expression that algebraically combines a vector of real-valued weights and a vector of metrics computed from the statistics of distances distributions including distribution area overlaps and distribution dispersion, wherein the expression of the multi-parameter objective function is in the form of a dot product of a vector $w$ of P weights $w=[w_0, \ldots, w_{P-1}]$ and a vector $m$ of Q metrics $m=[m_0, \ldots, m_{Q-1}]$ $$f = w \cdot m$$

wherein a possible configuration for the vector of weights is $w=[w_0, w_1, w_2]$, with $w_0$, $w_1$, and $w_2$ being real-valued constants, wherein a possible configuration for the vector of metrics is $m=[m_0, m_1, m_2]$, where $m_0$, $m_1$, and $m_2$ are the averages:

$$m_0 = \text{mean}\left(\text{overlap superclass distance distributions},\right.$$

$$m_1 = \text{mean}(\text{overlap different\_class distance distributions}),$$

$$m_2 = \text{mean}\left(\frac{1}{\text{dispersion individual class distance distributions}}\right),$$

wherein a possible expression for objective function $f$ following the dot-product form with vector of weights $w$ and vector of metrics $m$, $$f = w0 * m_0 + w1 * m_1 + w2 * m_2$$

wherein the weights $w_0$, $w_1$, and $w_2$ are the class weights for the classes, superclasses and the dispersion between individual classes, respectively.

25. The computer implemented method according to claim 15, further comprising sorting candidate data-augmentation effects from best to worst options given the values obtained by the multi-parameter objective function.

26. The computer implemented method according to claim 15, further comprising:

returning, as an output, a list with the top D candidate data-augmentation effects giving largest class separation in time-frequency (2D) feature space, as assessed by the multi-parameter objective function, for a provided dataset, wherein D is an integer number predefined or provided by a user.

\* \* \* \* \*